United States Patent
Garfein et al.

[15] 3,667,039
[45] May 30, 1972

[54] ELECTRICITY MEASUREMENT DEVICES EMPLOYING LIQUID CRYSTALLINE MATERIALS

[72] Inventors: Andre Garfein, Brighton; Wilhelm Rindner, Lexington; David C. Rubin, Somerville, all of Mass.

[73] Assignee: The United States of America as represented by the Administrator of the National Aeronautics and Space Administration

[22] Filed: June 17, 1970

[21] Appl. No.: 47,061

[52] U.S. Cl. ...................324/92, 324/96, 350/150, 350/160 R, 340/324 R
[51] Int. Cl. ...................G01r 27/22, G08b 23/00
[58] Field of Search ...................324/92, 96; 350/150, 160; 340/324

[56] References Cited

UNITED STATES PATENTS

| | | | |
|---|---|---|---|
| 3,524,726 | 8/1970 | de Koster | 340/324 X |
| 2,755,457 | 7/1956 | Diemer et al. | 324/96 |
| 3,130,348 | 4/1964 | Lieb | 324/96 |
| 3,244,979 | 4/1966 | Hershinger | 324/96 |

OTHER PUBLICATIONS

Castellano, J. A.; " Now That the Heat..." ; Electronics; July 6, 1970; pg. 64– 70

Primary Examiner—Rudolph V. Rolinec
Assistant Examiner—Ernest F. Karlsen
Attorney—John R. Manning, N. T. Musial and G. E. Shook

[57] ABSTRACT

Disclosed are measuring instruments utilizing liquid crystalline elements that exhibit visible change in response to input signals above given threshold levels. By applying the input signals non-uniformly so that the threshold value is exceeded in only certain portions of the liquid crystalline element, visible discontinuities are created therein. The locations of these discontinuities are made dependent on the magnitudes of the input signals, direct readouts of which are provided by suitably calibrated indicia.

7 Claims, 6 Drawing Figures

INVENTORS:
ANDRE GARFEIN,
WILHELM RINDNER,
DAVID C. RUBIN,
BY *Herbert E. Farmer* ATTORNEY INVENTORS:
ANDRE GARFEIN,
WILHELM RINDNER,
DAVID C. RUBIN,
BY Herbert E. Farmer  ATTORNEY

ELECTRICITY MEASUREMENT DEVICES EMPLOYING LIQUID CRYSTALLINE MATERIALS

ORIGIN OF THE INVENTION

The invention described herein was made by employees of the United States Government and may be manufactured and used by or for the government for governmental purposes without the payment of any royalties thereon or therefor.

BACKGROUND OF THE INVENTION

The present invention relates generally to condition responsive indicator devices and, more specifically, to visual indicators employing liquid crystalline materials.

Known types of ammeters and voltmeters typically rely on electro-mechanical effects to produce meter movements proportional in magnitude to the value of an electrical input being measured. The meter movement is observed with respect to calibrated measurement indicia providing readout of the sensed electrical inputs. Because of such factors as bearing failure and electrical burnout, the life expectancy of these conventional devices is limited. Also, their relatively delicate construction render the devices readily susceptible to damage. For example, most meters employ indicators such as moving pointers that can be physically distorted by electrical inputs beyond the dynamic range for which the unit is designed.

The object of this invention, therefore, is to provide an improved device that accurately measures electrical inputs while alleviating the problems noted above.

SUMMARY OF THE INVENTION

The indicating and measuring instruments disclosed herein utilize as a fundamental component an element made from the particular organic materials commonly known as liquid crystals. Such materials display changes in their optical properties when subjected to various types of electrical, thermal and mechanical input signals. Of particular interest for the present invention are cholesteric and nematic phase liquid crystalline materials that exhibit considerable color and/or reflectivity change when subjected to electric fields above a given threshold and cholesteric liquid crystalline materials that exhibit considerable color change and/or reflectivity change when subjected to temperatures above given threshold or transition levels. Signifantly, the original color or reflectivity of such materials return in response to a reduction in the magnitude of the applied electric field or temperature to below the given threshold level.

One featured embodiment of the invention provides a device for measuring electrical current. The device comprises a housing retaining a body of cholesteric phase liquid crystalline material elongated along a readout axis. Positioned in heat exchanging relationship with the liquid crystalline body is a resistance element having a non-uniform cross-section that decreases from one end of the readout axis to the other. Electrical contacts for receiving the current to be measured are connected to opposite ends of the resistor element. Because of its non-uniform electrical resistance, the resistor element generates I²R heat at different rates along its length. This in turn results in the transfer of heat into the liquid crystalline body at non-uniform rates along its readout axis. For any given input current within the range of the device, temperatures above its transition threshold level are generated in one portion of the liquid crystalline body and temperatures below the threshold level are generated in the remainder of the body. A transition line separating these two body portions is readily observed through a transparent wall of the housing because of the color or reflectivity change that occurs in only that portion in which the threshold temperature is exceeded. Furthermore, the relative location of the transition line on the crystalline body's readout axis is dependent upon the magnitude of current passing through the resistive heater element. Thus, suitably calibrated measurement indicia engraved on the housing provide a direct readout of input current.

Another featured embodiment of the invention provides a measuring and indicating instrument for measuring electrical voltage. This device also comprises a housing retaining a body of cholesteric or nematic phase liquid crystalline material elongated along a readout axis. Positioned on opposite sides of the liquid crystalline body parallel to its readout axis are a pair of electrodes. Opposite ends of one of the electrodes are connected to input contacts that receive an electrical voltage to be measured. The one electrode is formed of a material with a high value of electrical resistance so as to reduce the load on the source. The potential gradient along the readout axis produces through the liquid crystalline body an electric field the strength of which decreases from one end of the readout axis to the other. For any input voltage within the range of the device, electric field strengths above a transition threshold are applied through one portion of the liquid crystalline body and field strengths below the transition threshold are applied to the remainder of the body. As with the embodiment described above, a transition line separating the two body portions is clearly visible because of the color or reflectivity change created in the first portion. The relative position of the transition line on the crystalline body's readout axis is dependent upon input voltage magnitude which can therefore be determined by reference to suitably calibrated measurement indicia engraved on the housing.

Another featured embodiment of the invention also provides an indicating instrument for measuring electrical voltage. Again, the instrument comprises a housing retaining a body of cholesteric or nematic phase liquid crystalline material elongated along a readout axis. Extending along the readout axis on opposite sides of the crystalline body are a pair of electrodes connected to receive the voltage to be measured. The thickness of the liquid crystalline body between the electrodes decreases from one end of the readout axis to the other. Consequently, the application of voltage to the electrodes creates through the crystalline body an electric field of non-uniform strength that decreases from one end of the readout axis to the other. For any input voltage within the range of the device, electric field strengths above a transition threshold are applied through the narrower portion of the liquid crystalline body and field strengths below the transition threshold are applied to the remainder of the body. As with the embodiment described above, a transition line separating the two body portions is clearly visible because of the color or reflectivity change created in the narrow portion. The relative position of the transition line on the crystalline body's readout axis is dependent upon input voltage magnitude which can therefore be determined by reference to suitably calibrated measurement indicia engraved on the housing.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
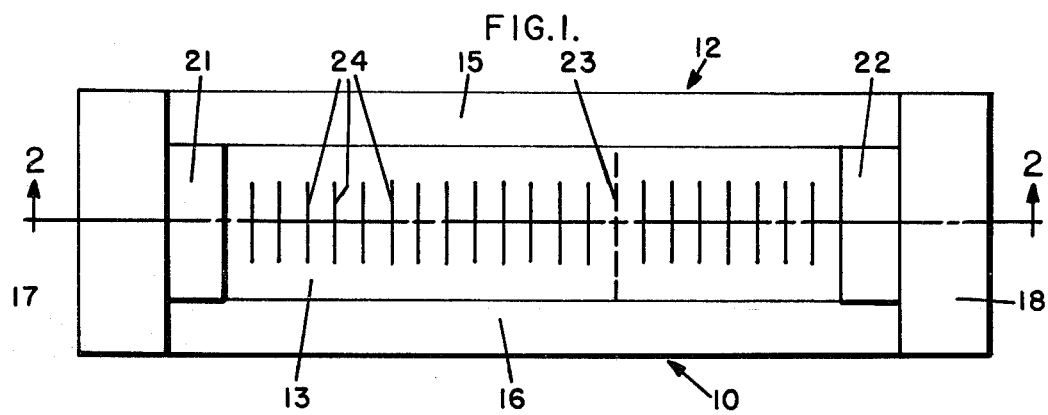
FIG. 1 is a plan view of one voltage indicating embodiment of the invention.
Figure 2:
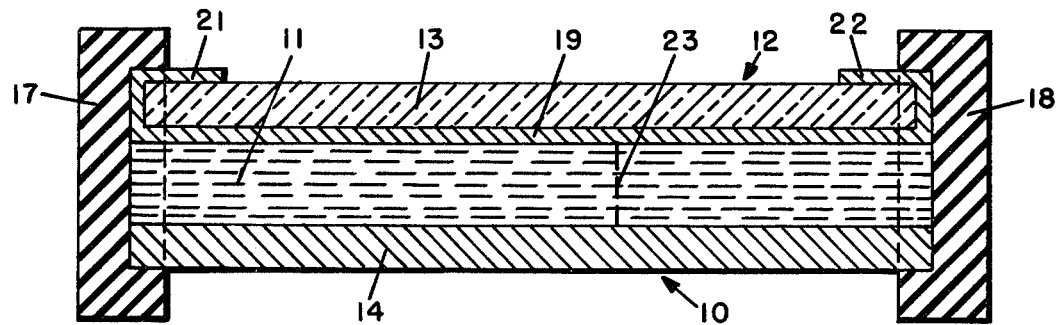
FIG. 2 is a cross-sectional view of the embodiment shown in FIG. 1 taken along lines 2—2.

Referring now to FIG. 1 and 2 there is shown a voltage indicating device 10 including a body of liquid crystalline material 11. Retaining the liquid crystalline material 11 is a housing 12 including an upper wall plate 13 formed of a transparent electrical insulator such as glass. Disposed parallel to the top wall 13 is a bottom wall formed by an electrically conductive electrode plate 14. A pair of side walls 15 and 16 extend between the top and bottom walls 13 and 14 on opposite sides of the liquid crystalline body 11. Closing the ends of the housing 12 are cup-shaped end walls 17 and 18 composed of a suitable electrical insulator material. Deposited on the inner surface of the top plate 13 is a transparent thin film resistor electrode 19 made of, for example, tin oxide. The deposited thin film resistor material extends around the ends of the top plate 13 and over limited portions of its top surface forming electrical input contacts 21 and 22.

During use of the voltage indicating instrument 10, the bottom electrode plate 14 is connected to one end of the thin film resistor electrode 19. The contacts 21 and 22 are then connected to an input voltage being measured creating an electric field across the liquid crystalline body 11 between the electrodes 19 and 14. Because of the potential gradient existing in the electrode 19, the electric field is of nonuniform strength that increases or decreases along the crystalline body's longitudinal axis between the contacts 21 and 22.

Assuming that the applied voltage is within the dynamic range of the instrument 10, the electric field induced over a given longitudinal portion of the crystalline body 12 will exceed its threshold transition level resulting in a visible change in its optical properties. For example, in a preferred embodiment using the crystalline material 11, cholesteryl chloride 30 percent, cholesteryl oleyl carbonate 70 percent and with electrode 14 blackened, the liquid crystal appears to experience a color change from red to black in response to the application of an electric field above a given threshold strength of approximately 1 kV/cm. The color change extends along the longitudinal axis of the crystalline body 11 between the positive input contact 22 and a transition line 23 shown in FIG. 1. The exact position of the transition line 23 created by the color discontinuity corresponds, of course, to that position at which the applied field strength equals the threshold value. Obviously, the relative position of the transition line along the longitudinal axis of the crystal is directly dependent upon the magnitude of the voltage applied between the contacts 21 and 22. Thus, a direct readout of the measured voltage is obtained by noting the position of the discontinuity 23 with respect to suitably calibrated indicia 24 engraved on the top plate 13 and extending along the longitudinal readout axis of the crystalline body 11.

Figure 3:
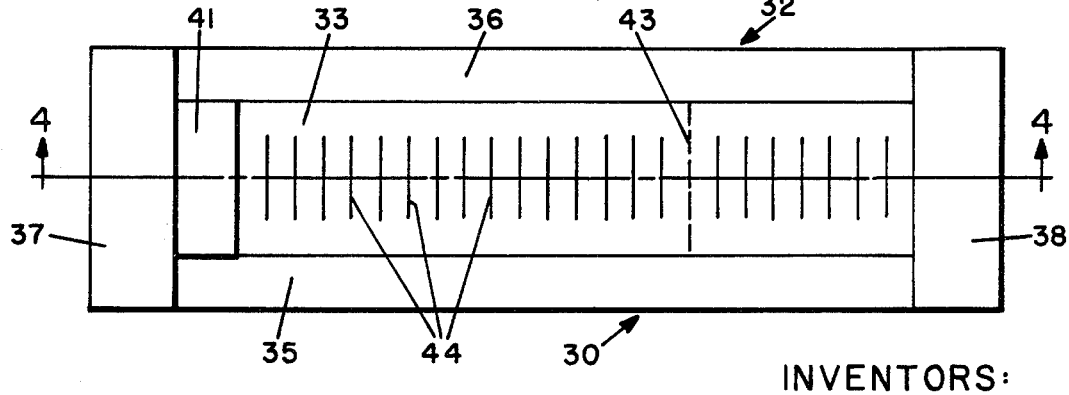
FIG. 3 is a plan view of another voltage indicating embodiment of the invention.
Figure 4:
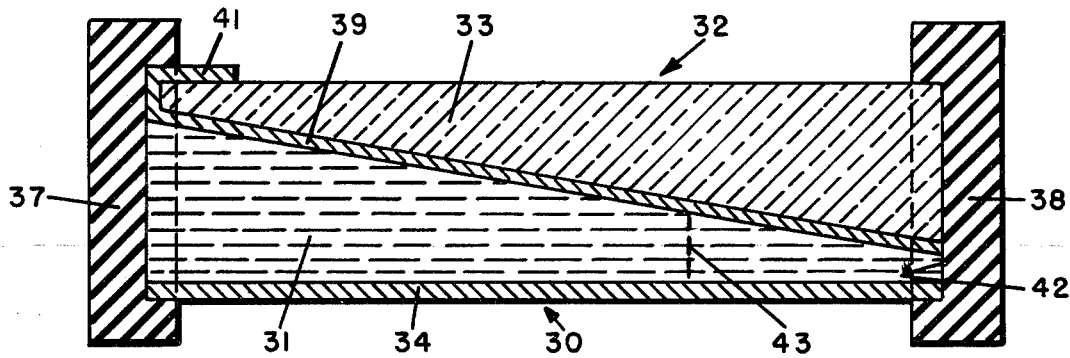
FIG. 4 is a cross-sectional view of the embodiment shown in FIG. 3 taken along lines 4—4.

Referring now to FIGS. 3 and 4, there is shown a voltage indicating device 30 including an elongated body of liquid crystalline material 31. Retaining the liquid crystalline material 31 is a housing 32 including an upper wall plate 33 formed of a transparent electrical insulator material such as glass and a bottom wall formed by an electrically conductive electrode plate 34. As shown in FIG. 4 the adjacent surfaces of the upper and lower walls 33 and 34 are non-parallel so as to establish a non-uniform thickness for the crystalline body 31. A pair of side walls 35 and 36 extend between the top and bottom walls 33 and 34 on opposite sides of the liquid crystalline body 31. Closing the ends of the housing 32 are cup-shaped end walls 37 and 38 composed of a suitable electrical insulator material. Deposited on the bottom surface of the top plate 33 is a transparent electrically conductive electrode 39 made of, for example, tin oxide. The deposited conductive material extends around one end of the top plate 33 and over a limited portion of its top surface forming an input contact 41.

During use of the voltage indicating instrument 10, the bottom electrode plate 34 and the input contact 41 are connected to receive an input voltage being measured. This creates an electric field across the liquid crystalline body 31 between the electrodes 34 and 39. Because of the crystalline body's non-uniform thickness, the strength of the applied field increases in a direction from input contact 41 toward the body's narrow end 42.

Assuming that the applied voltage is within the dynamic range of the instrument 30, the electric field induced over a given longitudinal portion of the crystalline body 31 will exceed a threshold transition level resulting in a visible change in its optical properties. For example, in a preferred embodiment, using a crystalline material 31 cholesteryl chloride 30 percent, cholesteryl oleyl carbonate 70 percent and with electrode 34 blackened the liquid crystal 31 appears to change color from red to black in response to an electric field above threshold level. The color change will extend along the longitudinal axis of the crystalline body 31 between the narrow end 42 and a transition line 43. The exact position of the transition line 43 created by the color discontinuity corresponds, of course, to that position at which applied field strength equals the threshold value. Obviously, the relative position of the transition line along the longitudinal axis of the crystalline body is directly dependent upon the magnitude of the voltage applied between the electrodes 34 and 39. Thus, a direct readout of the measured voltage is obtained by observing the position of the transition line 43 relative to suitably calibrated indicia 44 engraved on the top plate 33 and extending along the longitudinal readout axis of the crystalline body 31.

An important feature common to both of the embodiments described above is the creation of a non-uniform electric field through a suitable body of liquid crystalline material. It will be obvious that such an electric field can be created with structures other than those specifically shown and described. For example only, insulating layers with a non-uniform dielectric constant or of non-uniform thickness can be utilized between the electrodes' plates and the liquid crystalline body.

Figure 5:
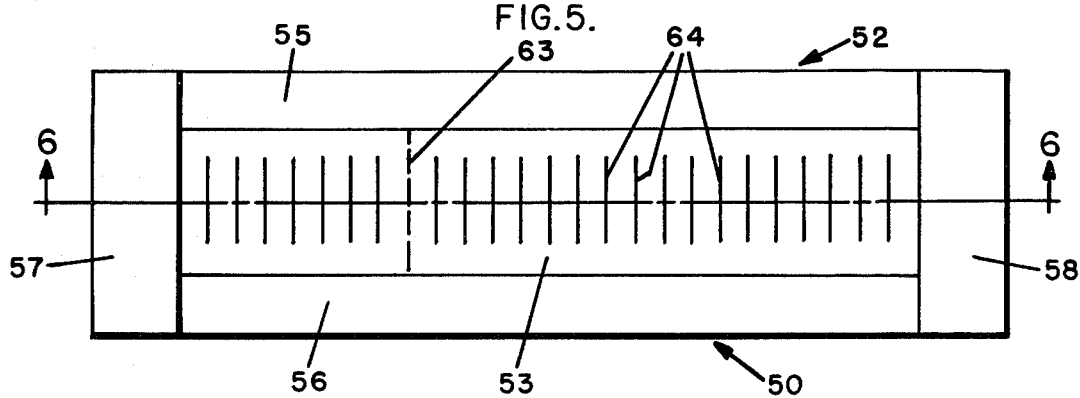
FIG. 5 is a plan view of a current indicating embodiment of the invention.
Figure 6:
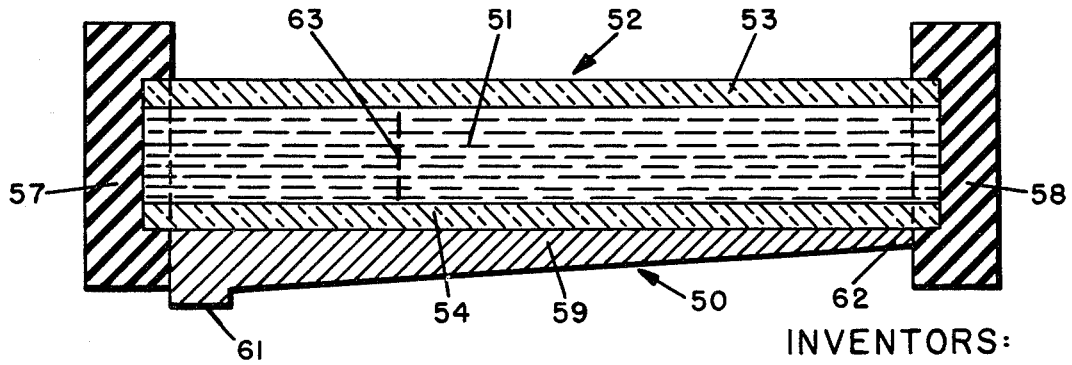
FIG. 6 is a cross-sectional view of the embodiment shown in FIG. 5 taken along lines 6—6.

Referring now to FIGS. 5 and 6 there is shown a current indicating device 50 again including a body of liquid crystalline material 31 preferably in the cholesteric phase. Retaining the liquid crystalline material 51 is a housing 52 including an upper wall 53 formed by a transparent electrical insulator material such as glass. Disposed parallel to the top wall 53 is a bottom wall 54 also formed of an electrical insulator material. A pair of side walls 55 and 56 extend between the top and bottom walls 53 and 54 on opposite sides of the liquid crystalline body 51. Closing the ends of the housing 52 are cup-shaped end walls 57 and 58 also composed of a suitable electrical insulator material. Deposited on the lower surface of bottom wall 54 is a resistive film 59 of non-uniform cross-section that decreases from end 61 to end 62. The opposite ends 61 and 62 of the resistive film 59 form input terminals.

During use of the current measuring instrument 50 the input terminals 61 and 62 are connected to receive an input current being measured. The resultant current flow through the resistive film 59 results in $I^2R$ heating that is transferred into the liquid crystalline body 51 through the bottom wall 54. Because of the resistive film's non-uniform cross-section, its electrical resistance and accordingly the $I^2R$ heat rates generated increase in a direction from the input terminal 61 toward the terminal 62. Thus, the rate of heat transfer also increases in that direction producing a temperature gradient along the longitudinal axis of the crystalline body 51.

Assuming that the measured current is within the dynamic range of the instrument 50, the temperature induced in a given portion of the crystalline body 51 adjacent the input terminal 62 will exceed a threshold transition level creating a change in its optical properties. For example, in a preferred embodiment, the crystalline material 51 is cholesteryl nonanoate which experiences a color change from red to violet in response to temperatures above a given threshold level in the range between 78° and 91°C. The color change extends along the longitudinal axis of the crystalline body 51 between input terminal 62 and a transition line 63. The exact position of the transition line 63 created by the color discontinuity corresponds, of course, to that position at which the crystalline body's temperature equals threshold value. Obviously, the relative position of the transition line 63 is directly dependent upon the magnitude of the current circulated through the resistive film 59. Thus, a direct readout of measured current is obtained by observing the longitudinal position of the transition line 63 with respect to suitably calibrated indicia 64 engraved on the top surface of top wall 53 and extending parallel to the longitudinal readout axis of the crystalline body 51.

It will be obvious that non-uniform heating of the liquid crystalline body 51 can be created by structural arrangements other than that specifically shown in FIGS. 5 and 6. For example, a non-uniform heat sink element can be used in heat exchange relationship with an electric heater of uniform resistance. Also non-uniform spacing between a heater element and the body of liquid crystalline material or non-uniform doping of a suitable semi-conducting resistive heater can be employed to provide non-uniform heating. It will be additionally apparent that the basic principles utilized in all the embodiments shown in FIGS. 1-6 could be applied to other device configurations including spiral, conical and others of arbitrary symmetry. The principles could also be extended to digital or alpha-numeric displays by appropriate masking, segmentation or step-shaped separation between the signal input means and the liquid crystalline body.

Other cholesteric materials also are suitable for use in the invention depending on the results desired. Descriptions of such materials and of the above noted color changes appear in the following publications: Gray, G. W., "Molecular Structure and the Properties of Liquid Crystals", New York, Academic Press, 1962; and Brown, G. H. et al, "Liquid Crystals", New York Gordon and Breach Science Publishers, 1967. Because of these many possible modifications, it is to be understood that the invention can be practiced otherwise than as specifically described.

What is claimed is:

1. Voltage indicating apparatus comprising: a housing for retaining liquid crystalline material, said housing having transparent wall means that allows visual observation of said liquid crystalline material and said housing having a readout axis; a body of liquid crystalline material distributed along the readout axis and filling the housing, said material having a voltage input transistion threshhold which when exceeded by an applied field strength causes said material to change optical properties; electrode means including a plurality of electrodes extending along said readout axis on opposite sides of said body of liquid crystalline material to direct an electrical field therethrough non-uniformly to exceed said transistion threshold field strength of the material progressively as the field is increased and; electrical contact means including a plurality of contacts for connection to a source under test connected to said electrode means, at least one of said electrodes being connected to said contacts at opposite ends of said readout axis so as to produce a substantial voltage drop along said axis upon connection of said contacts to said source under test.

2. Voltage indicating apparatus according to claim 1 including graduated readout indicia disposed on said housing means and distributed along said readout axis.

3. Voltage indicating apparatus according to claim 2 wherein said one electrode is formed from a transparent material so as to permit visual observation therethrough of said liquid crystalline body.

4. Voltage indicating apparatus according to claim 1 wherein said liquid crystalline body has a nonuniform thickness separating said electrodes along said readout axis.

5. Voltage indicating apparatus according to claim 4 including graduated readout indicia disposed on said housing means and distributed along said readout axis.

6. Voltage indicating apparatus according to claim 5 wherein said one electrode is formed from a transparent material so as to permit visual observation therethrough of said liquid crystalline body.

7. Voltage indicating apparatus according to claim 6 wherein said non-uniform thickness of said liquid crystalline body varies in a uniform sense from one end of said readout axis to the other.

* * * * *